United States Patent
Brown et al.

(10) Patent No.: US 12,180,996 B2
(45) Date of Patent: Dec. 31, 2024

(54) RETAINED THRUST BEARING

(71) Applicant: Schaeffler Technologies AG & Co. KG, Herzogenaurach (DE)

(72) Inventors: James Brown, Rock Hill, SC (US); Charles Schwab, Fort Mill, SC (US); Steven Corn, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 82 days.

(21) Appl. No.: 18/103,533

(22) Filed: Jan. 31, 2023

(65) Prior Publication Data
US 2024/0255025 A1    Aug. 1, 2024

(51) Int. Cl.
*F16C 33/04* (2006.01)
*F16C 17/04* (2006.01)

(52) U.S. Cl.
CPC ........... *F16C 33/046* (2013.01); *F16C 17/04* (2013.01)

(58) Field of Classification Search
CPC ...... F16C 19/30; F16C 19/305; F16C 33/588; F16C 35/067
See application file for complete search history.

(56) References Cited

U.S. PATENT DOCUMENTS

| | | |
|---|---|---|
| 10,544,829 B1 | 1/2020 | Ribeiro |
| 2003/0165281 A1* | 9/2003 | Fujioka ............... F16C 19/30 384/618 |
| 2012/0076451 A1* | 3/2012 | Brown ................ F16C 33/588 384/623 |
| 2014/0169721 A1* | 6/2014 | Hara .................... B23P 15/003 29/898.041 |
| 2016/0230809 A1* | 8/2016 | Roffe ................... F16C 33/588 |
| 2019/0271358 A1* | 9/2019 | Volcansek ........... F16C 33/546 |

* cited by examiner

*Primary Examiner* — James Pilkington
*Assistant Examiner* — Aimee Tran Nguyen

(57) ABSTRACT

A bearing includes a washer and a retention band. The washer includes an annular portion, a cylindrical outer flange, and a radius portion connecting the outer portion to the flange. The retention band includes a cylindrical ring disposed radially inside of the cylindrical outer flange, and a tab extending radially outward from the cylindrical ring. In an example embodiment, the tab extends radially outside of the washer. In some example embodiments, the cylindrical ring has a split. In an example embodiment, the split is circumferentially offset from the tab. In an example embodiment, the retention band also includes an axial leg connecting the tab to the cylindrical ring. In an example embodiment, the retention band has exactly one tab. In an example embodiment, the retention band has a plurality of circumferentially spaced tabs.

17 Claims, 1 Drawing Sheet

RETAINED THRUST BEARING

TECHNICAL FIELD

The present disclosure relates generally to a thrust bearing, and more specifically to a retained thrust bearing.

BACKGROUND

Thrust bearings with retention features are known. One example is shown and described in commonly-assigned U.S. Pat. No. 10,544,829 titled THRUST BEARING WITH RETENTION FEATURES to Ribeiro, hereby incorporated by reference as if set forth fully herein.

SUMMARY

Example embodiments broadly comprise a bearing including a washer and a retention band. The washer includes an annular portion, a cylindrical outer flange, and a radius portion connecting the outer portion to the flange. The retention band includes a cylindrical ring disposed radially inside of the cylindrical outer flange, and a tab extending radially outward from the cylindrical ring. In an example embodiment, the tab extends radially outside of the washer. In some example embodiments, the cylindrical ring has a split. In an example embodiment, the split is circumferentially offset from the tab. In an example embodiment, the retention band also includes an axial leg connecting the tab to the cylindrical ring. In an example embodiment, the retention band has exactly one tab. In an example embodiment, the retention band has a plurality of circumferentially spaced tabs.

In some example embodiments, the radius portion has a slot and the tab extends through the slot. In an example embodiment, the retention band also includes an axial leg connecting the tab to the cylindrical ring and a portion of the axial leg is disposed in the slot. In some example embodiments, the bearing also includes a rolling element contacting the washer, and at least a portion of the retention band radially overlaps at least a portion of the rolling element. In an example embodiment, the bearing also includes a cage for guiding the rolling element, and at least a portion of the retention band radially overlaps at least a portion of the cage. In an example embodiment, the bearing also includes comprising a cage for guiding the rolling element, and at least a portion of the retention band axially overlaps at least a portion of the cage.

In an example embodiment, the washer is stamped from a first sheet steel having a first thickness and the retention band is stamped from a second sheet steel having a second thickness, less than the first thickness. In an example embodiment, the bearing is a thrust bearing.

Example embodiments also comprise a bearing assembly including the bearing and a housing having a groove, the tab being disposed in the groove. In an example embodiment, the housing also includes an annular wall and a cylindrical wall. The annular portion contacts the annular wall and the cylindrical outer flange contacts the cylindrical wall. In an example embodiment, the groove is formed in the cylindrical wall.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
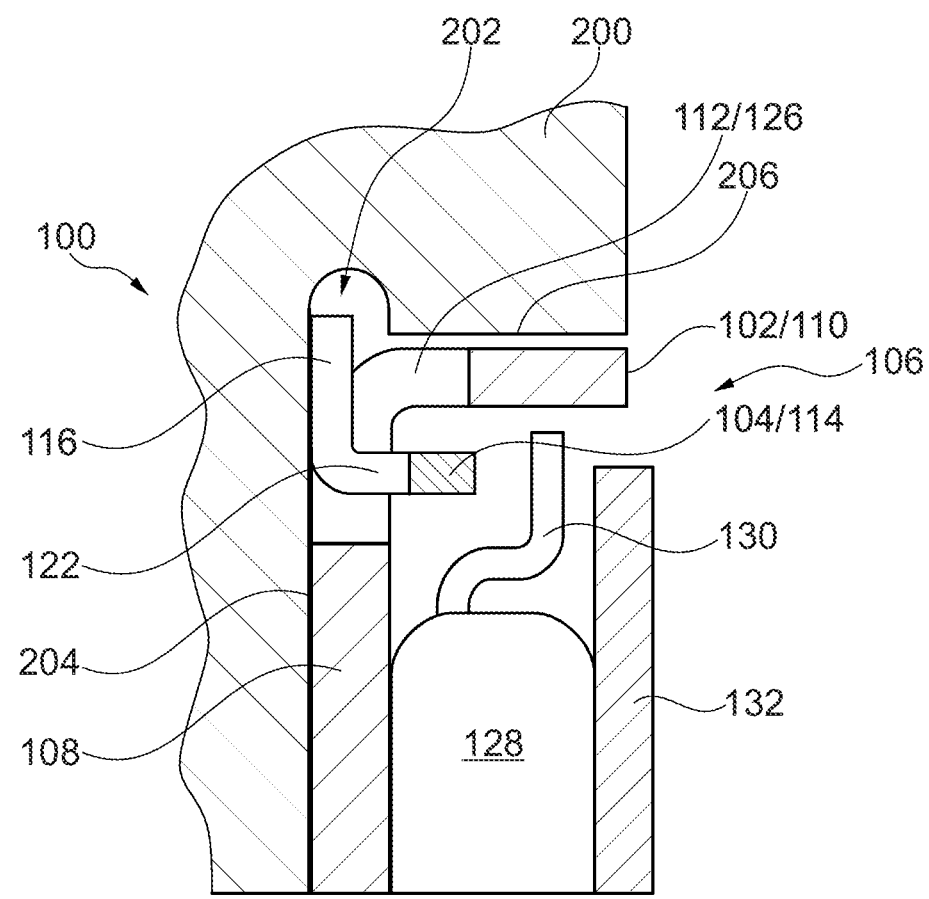
FIG. 1 illustrates partial cross-sectional view of a bearing assembly according to an example embodiment.
Figure 2:
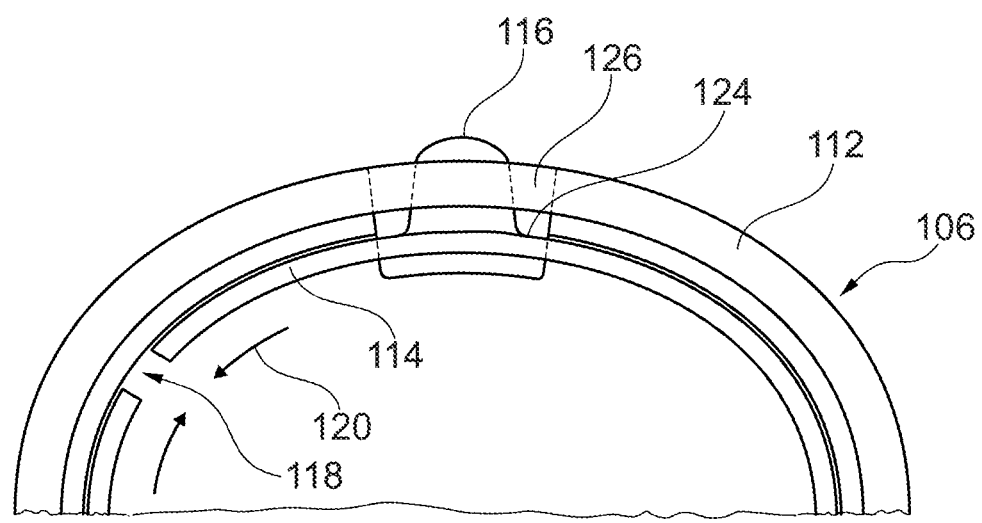
FIG. 2 illustrates a partial front view of a washer and a retention band of the bearing assembly of FIG. 1.

The following description is made with reference to FIGS. 1-2. FIG. 1 illustrates partial cross-sectional view of bearing assembly 100 according to an example embodiment. FIG. 2 illustrates a partial front view of washer 102 and retention band 104 of the bearing assembly of FIG. 1. Bearing assembly 100 includes bearing 106 with washer 102 and retention band 104. Washer 102 includes annular portion 108, cylindrical outer flange 110 and radius portion 112 connecting the outer portion to the flange. Retention band 104 includes cylindrical ring 114 disposed radially inside of the cylindrical outer flange and tab 116 extending radially outward from the cylindrical ring. As shown in FIG. 2, for example, tab 116 may have a semicircular outer profile.

Tab 116 extends radially outside of the washer. By extending radially outside of, we mean that a maximum radial dimension of the tab measured from a centerline of the bearing is greater than a maximum radial dimension of the washer. As shown in FIG. 2, for example, cylindrical ring 114 includes split 118. That is, the cylindrical ring is not continuous in a circumferential direction and includes a gap that allows circumferential compression of the cylindrical ring indicated by arrows 120 in FIG. 2. As ring 114 is circumferentially compressed, tab 116 is moved radially inward for installation in washer 102 and/or a bearing housing as described in more detail below. Split 118 is circumferentially offset from tab 116.

Retention band 104 also includes axial leg 122 connecting the tab to the cylindrical ring. That is, a protrusion with a width approximately that same as tab extends axially from the cylindrical ring to the tab. Band 104 may have radiused corners 124 at a joint between ring 114 and leg 122 for easier manufacturing. Retention band 104 may include exactly one tab 116 or a plurality of circumferentially spaced tabs. While one tab may be sufficient to retain the bearing in a housing (as described in more detail below), a plurality of tabs may be employed for additional holding or to better position the bearing against an annular wall of the housing, for example.

Returning to FIG. 1, radius portion 112 includes slot 126 and tab 116 extends through the slot. As indicated in FIG. 2, slot 126 is circumferentially wider than the tab so that the tab can extend through the slot. Adding slot to radius portion 112 means that annular portion 108 and cylindrical outer flange 110 are fully circumferential (e.g., have no gaps). The full annular portion provides a consisting running surface for a rolling element (described in more detail below) and the full cylindrical ring provides stability to the washer.

As discussed above, retention band 104 includes axial leg 122 connecting the tab to the cylindrical ring. As can be seen in FIG. 1, for example, a portion of the axial leg is disposed in the slot. Similar to the discussion above, extending the leg through the slot allows the cylindrical ring to be continuous (except for the split). Because the portion of the radius portion outside of the slot is circumferentially continuous, leg 122 permits a connection to tab 116 while a remainder of cylindrical ring 114 extends axially adjacent to radius portion 112.

Bearing 106 also includes rolling element 128 contacting washer 102. As shown in FIG. 1, a portion of the retention band radially overlaps a portion of the rolling element. Otherwise stated, a radial line can be drawn from a center of bearing 106 that extends through both the retention band and the rolling element. In the example shown, rolling element 128 is a cylindrical rolling element and bearing 106 is a thrust bearing.

Bearing 106 also includes cage 130 for guiding the rolling element in a known manner, and a portion of the retention band radially overlaps a portion of the cage. Cage 130 includes stepped outer ring 132 that axially overlaps a portion of the retention band. In other words, a portion of the retention band axially overlaps a portion of the cage. Otherwise stated, a line can be drawn parallel to a centerline of bearing 106 that extends through both the retention band and the cage. Stepped outer ring 132 of cage 130 provides clearance for cylindrical ring 114.

Washer 102 and retention band 104 may be made by stamping in a known manner. For example, the washer may be stamped from a first sheet steel and the retention band may be stamped from a second sheet steel. As can be clearly seen in FIG. 1, the washer is thicker than the retention band. In other words, the washer is stamped from a sheet steel having a thickness and the retention band is stamped from a sheet steel having a thickness that is less than the washer sheet steel thickness.

Bearing assembly 100 includes bearing 106 and housing 200. The housing includes groove 202 and tab 116 is disposed in the groove. Groove 202 may be a circumferentially continuous groove or only a partially circumferential groove with a circumferential width sufficient to receive a circumferential width of the tab, for example. During assembly of the bearing to the housing, the tab is displaced radially inward, as described above, to retain the bearing in the housing. Once the tab expands radially outward into the groove, the housing can be held in any position (including a position where the bearing is on a bottom side) and the bearing will not fall out. This may be desirable for installing other components into the housing, for example.

Housing 200 includes annular wall 206 and cylindrical wall 206 for positioning bearing 106. During operation of the bearing in the housing, annular portion 108 contacts the annular wall and cylindrical outer flange 110 contacts the cylindrical wall. As shown in FIG. 1, groove 202 is formed in the cylindrical wall. Groove 202 provides radial clearance for receiving tab 116. In other words, a radial dimension of the tab measured from a centerline of the bearing is less than a maximum radial dimension of the groove measured from a centerline of the cylindrical wall. Because groove 202 provides clearance for the portion of tab 116 extending past cylindrical outer flange 110, positioning of flange 110 in cylindrical wall 206 is not disrupted. Similarly, because the tab extends through slot 126 and ring 114 has clearance to cage 130, annular portion 108 can rest flat against annular wall 204 during operation of bearing 106 as a thrust bearing. Washer 132 may be a separate piece installed in bearing assembly 100 or a portion of bearing 106 secured to washer 102, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Bearing assembly
102 Washer
104 Retention band
106 Bearing
108 Annular portion (washer)
110 Cylindrical outer flange (washer)
112 Radius portion (washer)
114 Cylindrical ring (retention band)
116 Tab (retention band)
118 Split (cylindrical ring)
120 Arrows
122 Axial leg
124 Radiused corners
126 Slot
128 Rolling element
130 Cage
132 Washer
200 Housing
202 Groove
204 Annular wall
206 Cylindrical wall

What is claimed is:

1. A bearing, comprising:
    a washer comprising:
        an annular portion;
        a cylindrical outer flange; and
        a radius portion connecting the cylindrical outer flange to the annular portion; and
    a retention band comprising:
        a cylindrical ring disposed radially inside of the cylindrical outer flange; and
        a tab extending: i) radially outward from the cylindrical ring, and 11 radially outside of the washer.

2. The bearing of claim 1 wherein the cylindrical ring comprises a split.

3. The bearing of claim 2 wherein the split is circumferentially offset from the tab.

4. The bearing of claim 1 wherein the retention band further comprises an axial leg connecting the tab to the cylindrical ring.

5. The bearing of claim 1 wherein the retention band comprises exactly one tab.

6. The bearing of claim 1 wherein the retention band comprises a plurality of circumferentially spaced tabs.

7. The bearing of claim 1 wherein:
    the radius portion comprises a slot; and
    the tab extends through the slot.

8. The bearing of claim 7 wherein:
    the retention band further comprises an axial leg connecting the tab to the cylindrical ring; and
    a portion of the axial leg is disposed in the slot.

9. The bearing of claim 1 further comprising a rolling element contacting the washer, wherein at least a portion of the retention band radially overlaps at least a portion of the rolling element.

10. The bearing of claim 9 further comprising a cage for guiding the rolling element, wherein at least a portion of the retention band radially overlaps at least a portion of the cage.

11. The bearing of claim 9 further comprising a cage for guiding the rolling element, wherein at least a portion of the retention band axially overlaps at least a portion of the cage.

12. The bearing of claim 1 wherein:
    the washer is stamped from a first sheet steel comprising a first thickness; and
    the retention band is stamped from a second sheet steel comprising a second thickness, less than the first thickness.

13. The bearing of claim 1 wherein the bearing is a thrust bearing.

14. A bearing assembly comprising:
    a bearing according to claim 1; and
    a housing comprising a groove, wherein the tab is disposed in the groove.

15. The bearing assembly of claim 14 wherein:
    the housing further comprises an annular wall and a cylindrical wall;
    the annular portion contacts the annular wall; and
    the cylindrical outer flange contacts the cylindrical wall.

16. The bearing assembly of claim 15 wherein the groove is formed in the cylindrical wall.

17. A bearing, comprising:
    a washer comprising:
        an annular portion;
        a cylindrical outer flange; and
        a radius portion connecting the cylindrical outer flange to the annular portion; and
    a retention band comprising:
        a cylindrical ring disposed radially inside of the cylindrical outer flange; and
        a tab:
            extending radially outward from the cylindrical ring; and
            configured to be disposed within a groove of a housing, the groove arranged radially outwardly of the bearing.

\* \* \* \* \*